United States Patent [19]
Worsham

[11] 3,833,235
[45] Sept. 3, 1974

[54] WHEEL CAMBER-MAINTAINING ASSEMBLY

[76] Inventor: Doyle H. Worsham, Box 231, Boaz, Ala. 35957

[22] Filed: June 15, 1973

[21] Appl. No.: 370,318

[52] U.S. Cl. ............................................... 280/94
[51] Int. Cl. ............................................. B60g 3/00
[58] Field of Search ..... 280/94, 95 R, 96.2 B, 87 R, 280/89

[56] References Cited
UNITED STATES PATENTS

| | | | |
|---|---|---|---|
| 2,993,704 | 7/1961 | Worsham | 280/94 |
| 3,393,919 | 7/1968 | Ragsdale et al. | 280/94 |
| 3,721,455 | 3/1973 | Blanton | 280/94 |

Primary Examiner—Trygve M. Blix
Assistant Examiner—Jesus D. Sotelo
Attorney, Agent, or Firm—Berman, Bishoff & Platt

[57] ABSTRACT

A camber-maintaining structure for a motor vehicle front wheel. The structure consists of a T-shaped bracket rigidly attached to the horizontally pivoted A-frame of the vehicle. A rigidly clamped cross bar and pulley are slidably and pivotally connected to the stem of the bracket. A cable is engaged around the pulley and its ends are attached to the backing plate of the brake drum of the adjacent wheel. A pair of coiled springs connect the ends of the cross bar to the ends of the head portion of the bracket and act to bias the wheel toward its normal camber position. A sprocket wheel and sprocket chain may be used in place of the pulley and cable. In vehicles not employing a pivoted A-frame, the bracket may be attached directly to the vehicle frame.

14 Claims, 12 Drawing Figures

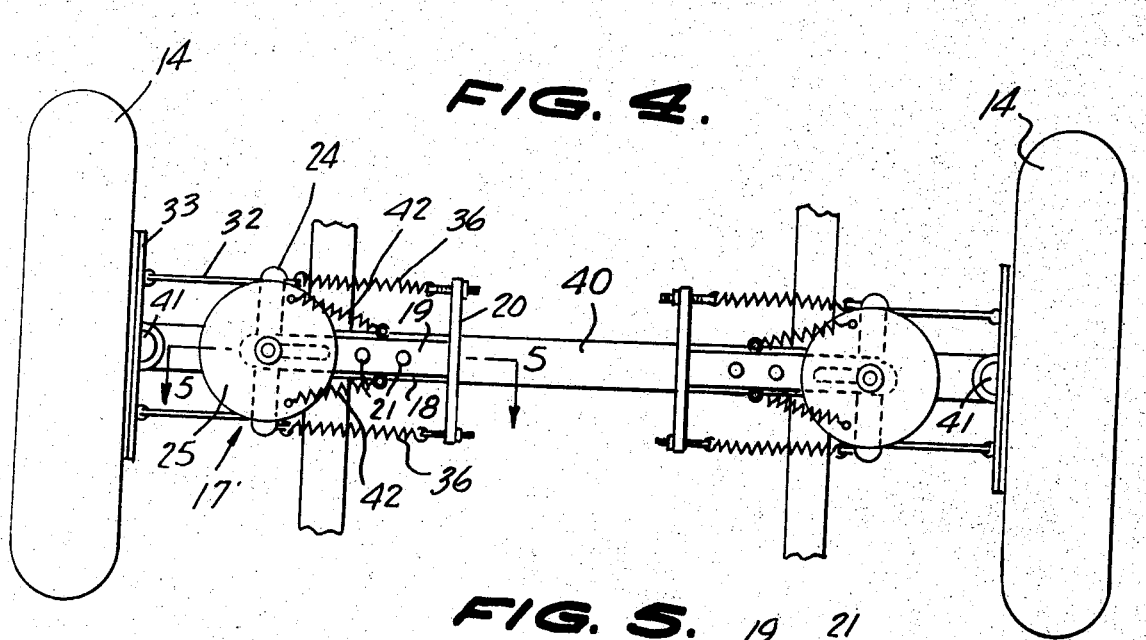
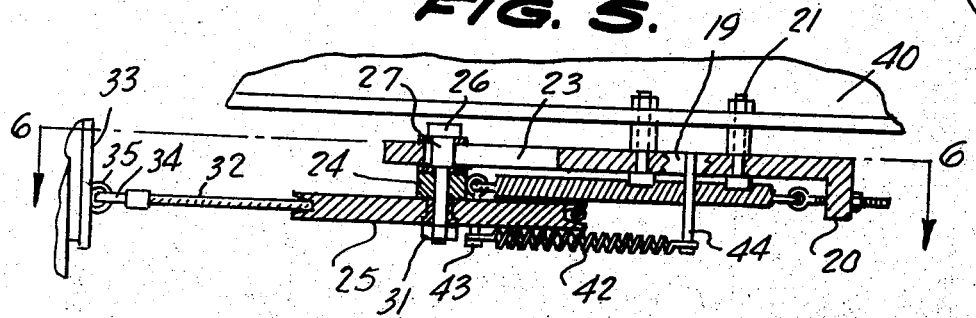
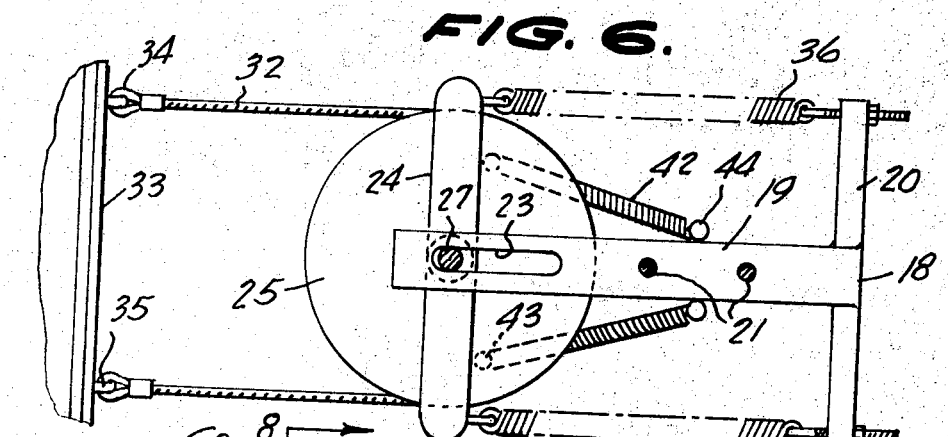
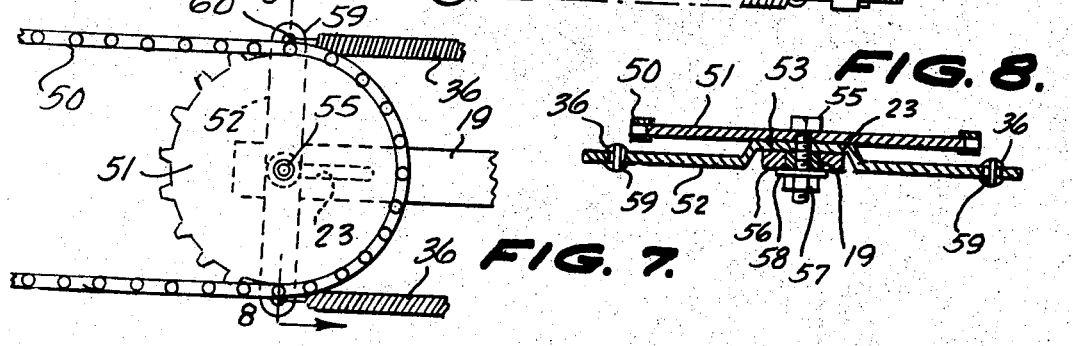

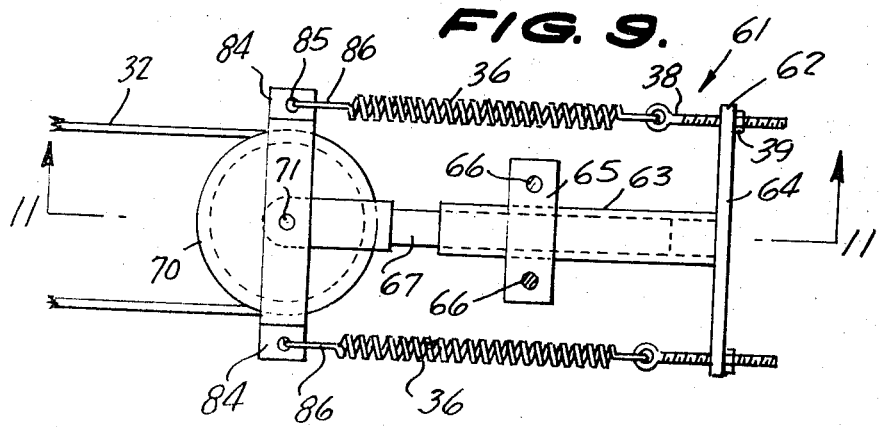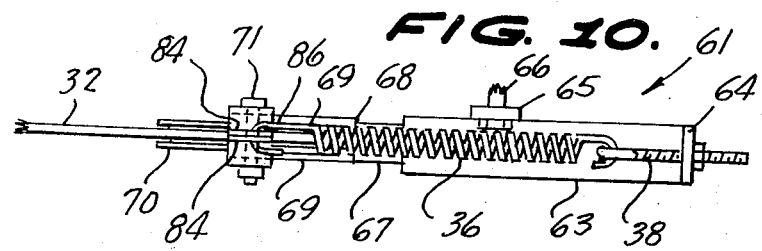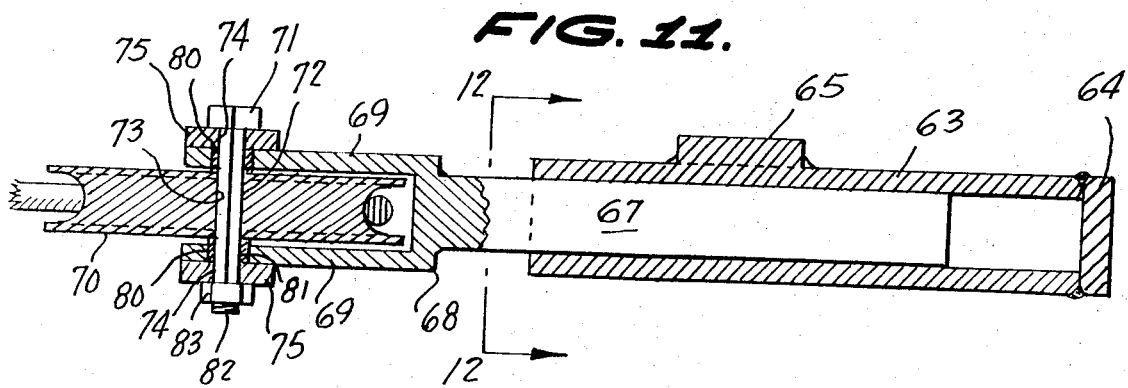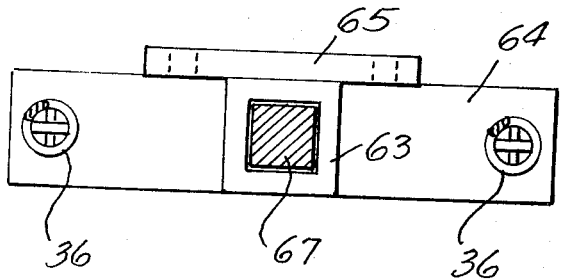

WHEEL CAMBER-MAINTAINING ASSEMBLY

This invention relates to improved stabilizing mechanisms for the steerable front wheels of vehicles, and more particularly to camber-maintaining structures for motor vehicle front wheels.

A main object of the invention is to provide a novel and improved camber-maintaining structure for a motor vehicle front wheel, the structure comprising relatively simple components, being easy to install, and acting to maintain the normal camber position of the front wheel with which it is used over a wide range of driving conditions, providing positive steering control and acting to greatly reduce wear and abrasion of the ball joints, tie rods and other components associated with the wheel.

A further object of the invention is to provide an improved camber-maintaining structure for the front wheel of a motor vehicle, said structure comprising relatively inexpensive components, being durable in construction, acting in a reliable manner to maintain proper camber of the wheel, acting to improve the smoothness of the steering action and thereby reduce driver fatigue, acting to provide a cushioning action when the associated wheel encounters obstacles or irregularities tending to momentarily misalign the wheel, and greatly improving the riding quality of the associated vehicle.

Further objects and advantages of the invention will become apparent from the following description and claims, and the accompanying drawings wherein:

FIG. 4 is a bottom plan view, similar to FIG. 1, showing a modified form of camber-maintaining structure according to the present invention.

FIG. 5 is an enlarged vertical cross-sectional view taken substantially on line 5—5 of FIG. 4.

FIG. 6 is a horizontal cross-sectional view taken substantially on line 6—6 of FIG. 5.

FIG. 7 is a fragmentary bottom plan view of a portion of a camber-maintaining structure according to the present invention, showing a modification wherein a sprocket wheel and sprocket chain are employed in place of the pulley and cable arrangement shown in the modifications of FIGS. 1 and 4.

FIG. 8 is an enlarged vertical cross-sectional view taken substantially on line 8—8 of FIG. 7.

FIG. 9 is a horizontal cross-sectional view similar to FIG. 3 but showing a further modification of the present invention.

FIG. 10 is a side elevational view of the structure shown in FIG. 9.

FIG. 11 is an enlarged longitudinal cross-sectional view taken substantially on line 11—11 of FIG. 9.

FIG. 12 is a transverse vertical cross-sectional view taken substantially on line 12—12 of FIG. 11.

Figure 1:
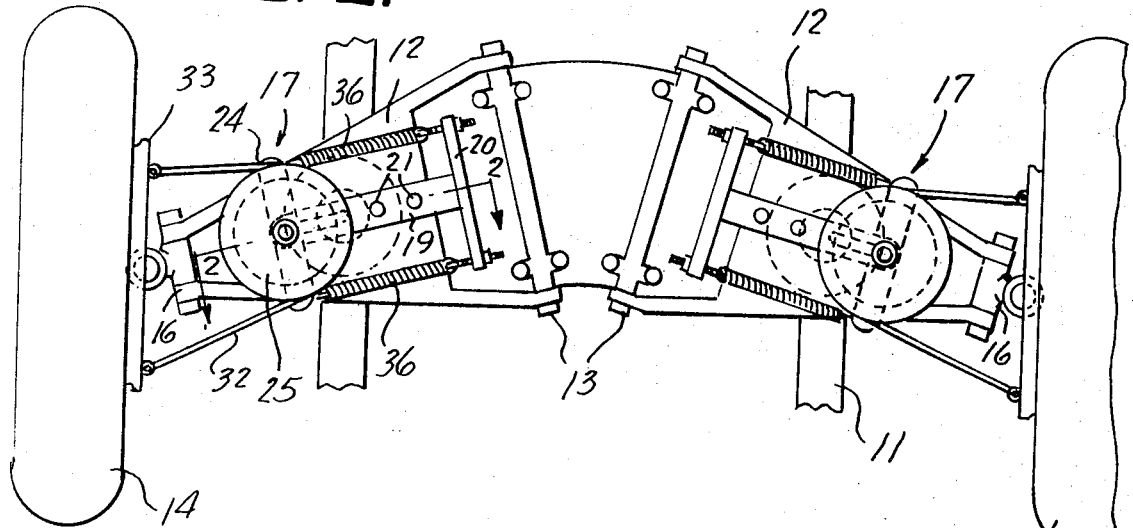
FIG. 1 is a bottom plan view of the front portion of a typical vehicle illustrating the use of improved camber-maintaining structures with the front wheels of the vehicle in accordance with the present invention.

Referring to the drawings, and more particularly to FIGS. 1 to 3, 11 generally designates a frame of a motor vehicle provided with conventional horizontally pivoted A-frames 12, 12 pivoted on respective convergent axles 13, 13, respective front wheels 14, 14 of the vehicle being pivotally connected to the outer end portions of the A-frames 12, 12 by means of conventional knuckle joint assemblies 16, 16. The front wheels 14, 14 are journalled in a conventional manner and are provided with a suitable steering linkage connected to the steering mechanism of the vehicle by conventional structure not shown.

In accordance with the present invention, each of the front wheels 14, 14 is provided with a stabilizing assembly designated generally at 17. Each stabilizing assembly 17 comprises a generally T-shaped bracket 18 having a stem portion 19 and a transversely extending depending head portion 20. The stem portion 19 is rigidly connected to the associated A-frame 12 by a pair of spaced fastening bolts 21, 21 in the manner shown in FIG. 2, suitable spacer sleeves 22 being provided on the bolts between the A-frame 12 and said stem portion 19, whereby the T-shaped bracket 18 is rigidly secured below and parallel to the A-frame.

Figure 2:
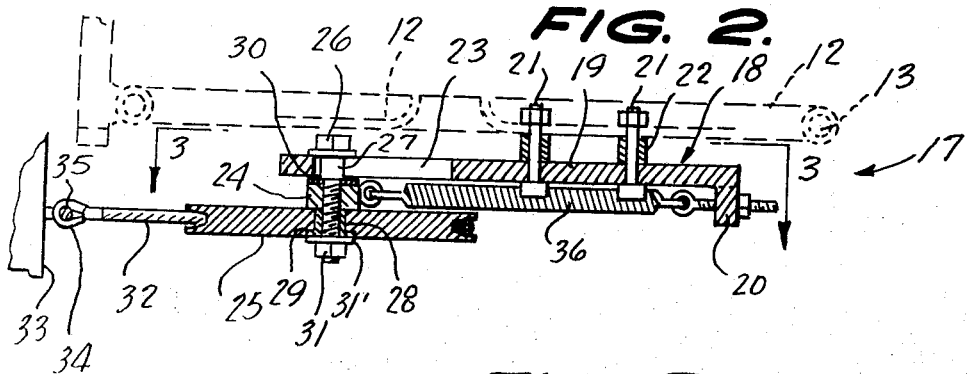
FIG. 2 is an enlarged fragmentary vertical cross-sectional view taken substantially on the line 2—2 of FIG. 1.
Figure 3:
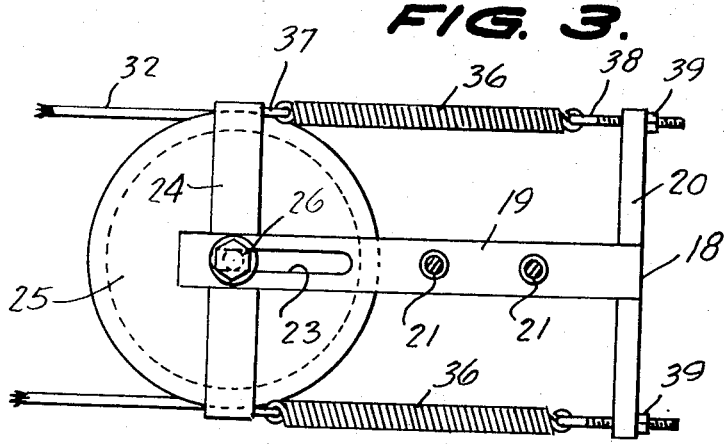
FIG. 3 is a horizontal cross-sectional detailed view taken substantially on line 3—3 of FIG. 2.

As shown in FIGS. 2 and 3, the stem portion 19 is provided with a longitudinal slot 23, and slidably and pivotally secured to stem portion 19 subjacent said slot is a cross bar member 24 and a peripherally grooved pulley member 25. Thus, the connecting means for slidably and pivotally connecting cross bar 24 and pulley 25 to stem portion 19 may comprise a headed bolt 26 having an enlarged shoulder portion 27 which extends through slot 23 and having the threaded shank portion 28 which is threadedly engaged through the midportion of the cross bar member 24 and which extends through the central bushing 29 of pulley 25. A bearing washer 30 is interposed between cross bar 24 and the shoulder portion 27 of bolt 26, and a clamping nut 31 and bearing washer 31' are provided on the bolt below pulley 25. The nut 31 rigidly clamps pulley 25 to cross bar 24 so that these members are rigidly connected together.

A flexible cable member 32 is engaged around the pulley 25 and the end portions of the cable member are secured in any suitable manner to diametrically opposite portions of the backing plate of the brake drum 33 of the associated front wheel 14. The connections of the ends of cable 32 may be made in any suitable manner, for example, by the provision of attachment eyes 34 on the ends of the cable and cooperating connection eyes or hooks 35 provided on the backing plate of the drum 33. For backing plates or drum structures different from that shown in FIG. 1, other suitable attachment means may be provided, such as suitable brackets attachable to the exposed brake structure and having suitable spaced hooks or eyes 35 adapted to be engaged with the loop eye 34 on the cable 32. Such brackets may be secured in any suitable manner, for example, may be welded or bolted to the associated backing plate.

The opposite ends of the cross bar member 24 are connected by respective coiled springs 36, 36 to the respective opposite ends of the head member 20 of the T-shaped bracket 18. Thus, as shown in FIG. 3, the springs 36 may be connected between eye members 37 and 38 provided respectively on the ends of the cross bar member 24 and head member 20. The connection of the springs to the head member 20 is made by eye bolts 38 having adjusting nuts 39 which may be tightened to provide a predetermined normal tension in the springs 36 sufficient to develop substantial tension in the cable 32 and to bias the associated wheel 14 toward its normal-camber position. The resilient springs 36, 36 allow the wheel 14 to at times deviate from such normal-camber position, for example, when momentarily encountering obstructions or irregularities in the road surface, but the springs act to promptly return the wheel 14 to its normal-camber position after such obstructions or irregularities have been passed. The springs 36, 36 thus provide a cushioning and stabilizing action, allowing necessary deviation of the wheels 14 from their normal-camber position but acting to quickly and smoothly return the wheels to said position.

FIGS. 4 to 6 illustrate a modified form of camber-maintaining structure according to the present invention, designated generally at 17' wherein each T-bar 18 is rigidly connected to a transversely extending axle element 40 which is rigidly connected to the vehicle frame and which has the respective front wheels 14, 14 pivotally connected to its opposite ends by conventional knuckle structures 41. Each of the assemblies 17' is provided with the slidably and pivotally connected cross bar element 24 and pulley element 25, clamped together and pivotally and slidably connected to the associated T-shaped bracket 18 in the same manner as above-described in connection with the embodiment shown in FIGS. 1 to 3. However, additional biasing coiled springs 42, 42 connect symmetrically opposed portions of each pulley member 25 to inwardly spaced portions of the side edges of the stem element 19 of the associated T-shaped bracket 18. Thus, as shown in FIG. 5, the springs 42 are connected between pin elements 43 secured on and depending from the disc member 25 and depending pin elements 44 rigidly secured to and depending from the side edges of the stem member 19. Thus, the auxiliary stabilizing springs 42, 42 are connected to symmetrically opposite pins 43, 43 secured to and depending from disc member 25 at points such that the springs converge inwardly toward the associated stem element 19. The auxiliary coiled springs 42, 42 act to reinforce the biasing action provided by the main coiled springs 36, 36.

FIGS. 7 and 8 show another modified form of the stabilizing assembly according to the present invention, wherein sprocket chains 50 and sprocket wheels 51 are substituted for the cables 32 and peripherally grooved pulleys 25 in the previously described embodiments of the invention. In the form of the invention shown in FIGS. 7 and 8, the cross bar element comprises a cross bar 52 having an upwardly offset central portion 53 which receives stem portion 19, the offset portion 53 having sufficient clearance to allow for the expected maximum amount of rotation of cross bar 52 with respect to stem portion 19.

As in the previously described forms of the invention, the wheel member 51 is rigidly clamped to the cross bar member 52 at the central offset portion 53 of the cross bar by means of a fastening bolt 55 having a spacing bushing 56 engaged in the longitudinal slot 23 of stem member 19, the shank of the bolt 55 being threadedly engaged with offset portion 53 and being provided with a clamping nut 57 and a bearing washer 58 located between the nut 57 and the bottom surface of stem member 19 and acting to transmit clamping force to the spacer bushing 56. Bushing 56 is slidable and pivotal in slot 23.

As in the previously described forms of the invention, the sprocket wheel 51 and cross bar element 52 are rigidly united and are movable together responsive to deviations of the associated front wheel from normal-camber position, such as deviations caused by encountering obstacles and irregularities in the road surface. The biasing springs 36, 36 act to return the wheel toward its normal-camber position in the same manner as above-described in connection with the embodiments illustrated in FIGS. 1 through 6.

In the modification shown in FIGS. 7 and 8, the offset midportion of the cross bar member 52 serves to provide adequate clearance for the sprocket chain 50 and for the attachment end loops 59, 59 of the biasing springs 36, 36, which are engaged through apertures 60 provided in the opposite ends of the cross bar member 52, as shown.

In the modified form of the invention shown in FIGS. 9 through 12, the camber-maintaining structure designated generally at 61 comprises the generally T-shaped bracket 62 having the square hollow sleeve-like stem portion 63 and the transversely extending head portion 64. Rigidly secured on stem portion 63 is a transversely extending bracket member 65 which is rigidly connected to the upwardly adjacent portion of the vehicle frame by spaced fastening bolts 66, 66 corresponding to the fastening bolts 21, 21 employed in the previously described forms of the invention. Thus, the T-shaped bracket 62 is rigidly secured to the upwardly adjacent portion of the vehicle frame.

Slidably but non-rotatably engaged in the sleeve-like square stem member 63 is a square bar member 67 provided with the end yoke 68 having the parallel top and bottom yoke arm 69, 69. A peripherally grooved pulley 70 is journalled between the yoke arms 69, 69 by means of a bolt 71 having a squared main shaft portion 72 which is engaged through a square central aperture 73 of the pulley and through square apertures 74, 74 of top and bottom cross bar members 75, 75 between which the yoke arms 69, 69 are received, the square shaft portion 72 being engaged through bushings 80, 80 having squared central apertures, said bushings being outwardly circular in shape and being rotatably received in circular apertures 81 provided in the end portions of the yoke arms 69. The bolt 71 has a reduced threaded end portions 82 on which a clamping bolt 83 is engaged, as shown in FIG. 11.

The cross bar members 75, 75 have end portions 84 which are offset towards each other and which may be welded together, the joined respective opposite pairs of joined end portions 84, 84 being apertured at 85 to receive hook end portions 86 of respective coil springs 36, 36 similar to those previously described in connection with the other forms of the invention. The opposite ends of the springs 36 are connected to eye bolts 38 engaged through apertures provided in the opposite ends of head member 64, said eye bolts being provided with tensioning nuts 39 as in the previously described forms of the invention.

Thus, the pulley 70 is locked to the cross bar elements 75, 75 but is rotatable between the yoke arm 69, 69 because of the provision of the bushing members 80, 80 as above-described.

The cable 32 is engaged around the pulley 70 and is connected to the backing plate of the associated brake drum in the manner previously described.

In operation, the resilient springs 36, 36 allow the associated wheel to at times deviate from normal-camber position as described in connection with the previously disclosed forms of the invention, the springs acting to promptly return the associated wheel to its normal-camber position after obstructions or irregularities have been passed, said springs providing a cushioning and stabilizing action, allowing necessary deviation of the wheel from its normal-camber position but acting to quickly and smoothly return the wheel to said position.

The telescoping sliding engagement of the square bar member 67 in the hollow square sleeve member 63 allows the pulley 70 to reciprocate freely, as required, with relatively little friction and with minimum wear. Also, the modification shown in FIGS. 9 through 12 has been found to be somewhat less expensive to manufacture than the previously described forms of the invention.

While certain specific embodiments of an improved camber maintaining structure for motor vehicle wheels are disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a motor vehicle, a wheel assembly steerably journalled to the vehicle, a T-shaped bracket member secured to the vehicle with its stem portion directed toward said wheel assembly, a disc-like member, means slidably and rotatably connecting said disc-like member to said stem portion, a flexible tension member engaged around the periphery of said disc-like member and having its ends secured to opposite portions of said wheel assembly so that the disc-like member rotates when the wheel assembly moves away from the normal-camber position, and spring means connected between said disc-like member and the T-shaped bracket member and biasing said disc-like member toward a position corresponding to the normal-camber position of the wheel assembly.

2. The structural combination of claim 1, and wherein said stem portion is formed with a longitudinal slot and the means slidably and rotatably connecting said disc-like member to said stem portion comprises pivot bolt means secured to the disc-like member and engaged in said slot.

3. The structural combination of claim 2, and a cross bar member rigidly secured to said disc-like member, said spring means being connected between said cross bar member and the T-shaped bracket member.

4. The structural combination of claim 3, and wherein said spring means comprises respective coiled springs connected between the end portions of said cross bar member and the T-shaped bracket member.

5. The structural combination of claim 4, and wherein said coiled springs are connected between the ends of the cross bar member and the ends of the head portion of the T-shaped bracket member.

6. The structural combination of claim 5, and wherein said pivot bolt means is provided with abutment means slidably and pivotally received in said slot and clampingly engaged against said cross bar member.

7. The structural combination of claim 6, and wherein said disc-like member comprises a peripherally grooved pulley and said tension member comprises a flexible cable engaged in the peripheral groove of the pulley.

8. The structural combination of claim 6, and wherein said disc-like member comprises a sprocket wheel and said tension member comprises a sprocket chain engaged with teeth of the sprocket wheel.

9. The structural combination of claim 7, and auxiliary coiled biasing springs connecting symmetrically opposite portions of said pulley to the stem portion of the T-shaped bracket member.

10. The structural combination of claim 8, and wherein the intermediate portion of the cross bar member is formed with an offset receiving the stem portion of the T-shaped bracket member.

11. The structural combination of claim 1, and wherein said stem portion comprises a hollow sleeve member and the means slidably and rotatably connecting said disc-like member to said stem portion comprises yoke means in which said disc-like member is journalled, said yoke means having a supporting bar element slidably received in said sleeve member.

12. The structural combination of claim 11, and wherein said sleeve member is non-circular in cross-section and the supporting bar element is of corresponding cross-sectional shape whereby it is slidably and non-rotatably received in said sleeve member.

13. The structural combination of claim 12, and cross bar means rigidly secured to said disc-like member, said spring means being connected between said cross bar means and the T-shaped bracket member.

14. The structural combination of claim 13, and wherein said cross bar means comprises top and bottom cross bar elements between which said yoke means is received, said spring means comprising respective coiled springs connected between the end portions of said cross bar elements and the T-shaped bracket member.

* * * * *